United States Patent
Verma et al.

(10) Patent No.: US 9,858,642 B2
(45) Date of Patent: Jan. 2, 2018

(54) GEOMETRIC MODEL FOR VISUALLY DEBUGGING MASSIVE SPATIAL DATASETS

(71) Applicant: Oracle International Corporation, Redwood Shores, CA (US)

(72) Inventors: Rupesh Verma, Sunnyvale, CA (US); Subramanian Venkateswaran, Santa Clara, CA (US); Yao-Cheng Tien, Milpitas, CA (US); Jay J. Zhu, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 84 days.

(21) Appl. No.: 14/707,896

(22) Filed: May 8, 2015

(65) Prior Publication Data
US 2016/0328826 A1    Nov. 10, 2016

(51) Int. Cl.
- *G06T 3/40* (2006.01)
- *G06T 11/20* (2006.01)
- *G09G 5/373* (2006.01)

(52) U.S. Cl.
CPC ............ *G06T 3/40* (2013.01); *G06T 11/206* (2013.01); *G09G 5/373* (2013.01); *G09G 2340/045* (2013.01)

(58) Field of Classification Search
None
See application file for complete search history.

(56) References Cited

U.S. PATENT DOCUMENTS

| | | | |
|---|---|---|---|
| 2012/0154522 A1* | 6/2012 | Yoo ................ | H04N 5/247 348/36 |
| 2014/0292617 A1* | 10/2014 | Tejada Lacaci ...... | G06F 3/1446 345/1.2 |
| 2014/0298153 A1* | 10/2014 | Tsujimoto ............ | G02B 21/365 715/232 |
| 2014/0376817 A1* | 12/2014 | Yaguchi ............. | A61B 1/00009 382/195 |
| 2015/0133216 A1* | 5/2015 | Heinz, II ............. | A63F 13/355 463/31 |

OTHER PUBLICATIONS

Andersen et al ("A singlet Oxygen Image with 2.5m Resolution", 2002, J. Phys. Chem. A 2002, 106, 8488-8490).*

* cited by examiner

*Primary Examiner* — Kee M Tung
*Assistant Examiner* — Xin Sheng
(74) *Attorney, Agent, or Firm* — Hickman Palermo Becker Bingham LLP (57) ABSTRACT

Techniques herein are for generating geometric models. A method involves receiving a raw data set. Generation parameters include an abstraction function, a raw data set, a plurality of size pairs, and a quality interval. Each size pair comprises a view size and a portion size. The view size comprises an amount of display area. The portion size comprises an amount of raw data. For each size pair, associate a set of grid square sizes with the size pair. Each grid square size comprises a multiple of natural units. The quality interval contains a multiplicative product of the grid square size times a ratio of the view size to the portion size. Generate a set of geometric models based on the raw data set, the plurality of size pairs, the abstraction function, and the set of grid square sizes associated with the plurality of size pairs.

18 Claims, 7 Drawing Sheets

INCIDENCE MATRIX 600

| SIZE PAIR 610 (microns, pixels) | GRID SQUARE SIZE 621 (microns x microns) | | | | | |
|---|---|---|---|---|---|---|
| | 1 x 1 = 1 | 2 x 2 = 4 | 3 x 3 = 9 | 4 x 4 = 16 | 5 x 5 = 25 | 6 x 6 = 36 |
| COST 622 | 1 / 1 = 1 | 1 / 4 = 0.25 | 1 / 9 = 0.11 | 1 / 16 = 0.06 | 1 / 25 = 0.04 | 1 / 36 = 0.03 |
| 400, 600 | ✓ | ✓ | | | | |
| 400, 620 | ✓ | ✓ | | | | |
| 400, 1500 | ✓ | | | | | |
| 1000, 600 | | ✓ | ✓ | | | |
| 1000, 1080 | | | ✓ | ✓ | | |
| 1000, 1500 | ✓ | ✓ | | | | |
| 3000, 1024 | | | ✓ | | | |
| 3000, 1080 | | | | ✓ | ✓ | |
| 3000, 1200 | | | | | ✓ | ✓ |
| 3000, 1500 | | | | | ✓ | ✓ |
| ASSOCIATIONS 641 | 4 | 4 | 3 | 3 | 5 | 5 |
| FREQUENCY 642 | ALMOST | ALMOST | | | MOST | MOST |
| BASE SQUARE SIZE 643 | YES | YES | | YES | | |
| EFFICIENT MULTIPLE 644 | | YES | | | | YES |
| GEOMETRIC MODEL 645 | | YES | | | | YES |

GEOMETRIC MODEL FOR VISUALLY DEBUGGING MASSIVE SPATIAL DATASETS

TECHNICAL FIELD

Embodiments relate generally to techniques for selecting geometric models from which display images may be generated. Specific techniques are included that use an incidence matrix to guide the selection.

BACKGROUND

The challenge of visualizing and interacting with a massive spatial or multidimensional dataset exists in many problem domains ranging from hotspots in chip design to stresses on the hull of a ship to displaying humungous matrices. Spatial data can grow along its physical dimensions or it can grow in terms of sheer density. Interactive visualization that is trivial to do with a small dataset becomes unwieldy if the data size is excessive.

A multitude of problem domains, like chip design, deal with massive spatial data. Design elements such as instances, transistor geometries, and other electrical elements are often projected on a Euclidean plane. Frequently there is a need to visualize such data to assist a human analyst. A good visual debugging tool provides an overview of phenomena to a user. The user can drill down on demand. Typically, the lifecycle of generating any visual involves devising a geometric model representing shapes in a virtual scene, using software graphics libraries to transfer the geometric model to a digital image, and using image processing to enhance the image further. Image processing is computationally expensive and hence done for visuals that are fairly static. Image processing traditionally is infeasible for dynamic images that change often, such as with a visual debugger that is able to almost instantaneously refresh.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Geometric Model Generation Generally
    2.1 Geometric Model Downscaling
    2.2 Eager Generation Of Geometric Models
    2.3 Size Parameters
    2.4 Image Quality Interval
    2.5 Selecting Geometric Models
    2.6 Populating Geometric Models With Data
    2.7 Cost Power Law Prunes NP-Hard Combinatorics
  3.0 Geometric Model Generation Process
    3.1 Selection Of Base Square Size
    3.2 Selecting A Geometric Model For Display Image Generation
    3.3 Maximizing Coverage Of Size Pairs During Geometric Model Generation
    3.4 Populating An Incidence Matrix And Calculating Unit Costs
    3.5 Using The Incidence Matrix To Select Base Square Size
  4.0 Unit Cost Of Generating A Given Geometric Model
  5.0 Hardware Overview
  6.0 Extensions and Alternatives 1.0. General Overview Techniques are described herein for generating geometric models of raw data from which display images may later be generated. Raw data includes bulk empirical data that either represents spatial information or is otherwise amenable to spatial presentation. In an embodiment, a computer receives a raw data set. The computer also has metadata that guides geometric model generation. The metadata includes an abstraction function, an image quality interval, and size pairs. Each size pair has a view size and a portion size chosen by a visualization expert. The view size specifies an amount of display screen real estate. The portion size specifies an amount of the raw data set to consider.

Each geometric model to be generated has a Cartesian grid of a distinct grid square size. The computer associates grid square sizes with size pairs. Whether a given association is created depends on whether an image quality that is calculated from a given grid square size and given size pair fits within the image quality interval.

From the associated grid square sizes, the computer selects one to be the base square size. The computer also selects grid square sizes that are multiples of the base square size. For each selected grid square size, the computer generates a geometric model whose resolution is determined by the corresponding grid square size.

In an embodiment, an incidence matrix is used to select the base square size.

In an embodiment, a display image is generated from a geometric model.

2.0 Geometric Model Generation Generally

Figure 1:
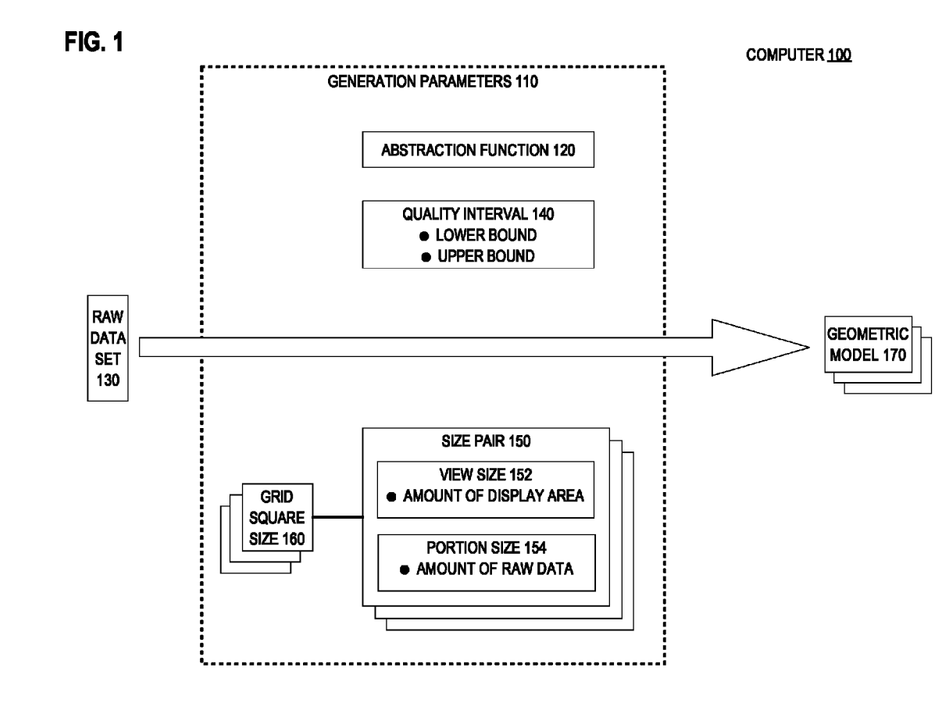
FIG. 1 is a logical block diagram illustrating an example computer in which certain techniques described herein may be implemented, according to various embodiments.

FIG. 1 illustrates a block diagram of example computer 100 that generates geometric models of various resolutions from raw data based on quality criteria, in which techniques described herein may be practiced. Computer 100 may be a personal computer, embedded computer such as a single board computer, system on a chip, smartphone, network appliance, rack server such as a blade, mainframe, virtual machine, any other computer able to convert raw data into geometric models, or any aggregation of these computers. Computer 100 includes geometric models 170, to be generated by computer 100, and generation parameters 110.

Although geometric models 170 may be raster graphics images in dot matrix format, geometric models 170 are not intended for display. Rather, geometric models 170 are an intermediate format from which display images may later be generated. Geometric models 170 may be encoded in any format from which display images may be generated with less computation than would be needed to generate display images directly from raw data set 130. As such, geometric models 170 need not be encoded as raster graphics images, in dot matrix format, or in any graphics image format. Indeed, geometric models 170 might not directly involve visual data. For example, geometric models 170 may be heat maps composed of grid squares, with each grid square encoding a temperature, which is not visual data.

Generation parameters 110 is a collection of various information needed to intelligently determine the quantity, resolution, and content of geometric models 170. Generation parameters 110 includes abstraction function 120, quality interval 140, size pairs 150, and grid square sizes 160. Generation parameters 110 may reside as isolated data, such as in a database or data file or as constants that are hard coded into a codebase.

Raw data set 130 may arrive at computer 100 by networked file transfer, remote messaging, interactive entry, other mechanisms of data ingestion, or combinations of these. Raw data set 130 includes bulk empirical data that either represents spatial information or is otherwise amenable to spatial presentation. For example, raw data set 130 may be a collection of polygons that each represents a very large scale integration (VLSI) circuit device, such as a transistor. Within raw data set 130, these polygons may be encoded as vector graphics or other geometric primitives that are not rasterized, thereby making generation of geometric models 170 computationally expensive due to needing to perform rasterization.

Furthermore, because geometric models 170 may instead encode non-visual data, such as temperature, rasterization may be more complex than merely rendering polygons of raw data set 130. For example if a geometric model 170 is a heat map of a VLSI circuit, then the temperature of a grid square may depend not only on which microelectronic devices occupy the grid square, but also which devices are nearby, how the devices are interconnected, and whatever additional computation is involved in distilling a local temperature value.

The complexity of calculating the value of a grid square is encapsulated in abstraction function 120. Abstraction function 120 performs geometric and other mathematical aggregate operations that combine or adjust local shapes and data points that overlap, interfere, or otherwise have a combined effect and may depend on the size of the grid square. Aggregate operations may be statistical such as a maximum, a minimum, a count, a mean, a variance, a median, or a mode.

2.1 Geometric Model Downscaling

Additionally, raw data set 130 may exceed, by sheer volume, the presentation capacity of a user terminal such as a personal computer. For example, lossless presentation based on raw data set 130 might need screen real estate available only by aggregating dozens of computer display monitors. Without those monitors, lossless presentation of raw data set 130 might entail an hour of tedious scrolling within one display monitor. During rasterization of raw data set 130, computer 100 may have the capacity and time needed to individually determine each natural data point of raw data set 130. However, the human eye might not perceive so high a resolution, and the display personal computer might be unable to lively present such detail. Also, full resolution may have an excessive network transmission cost. As such, lossy compression is desirable, which is achieved by downscaling into a Cartesian grid that is coarser than the natural details of raw data set 130.

Downscaling achieves a reduction of visual resolution that involves demagnification as if from a zoomed out vantage point such that fine details shrink until oversimplified or otherwise lost. Downscaling introduces problems such as maintaining image quality.

Each of geometric models 170 covers the entire geometric extent of raw data set 130. However, each geometric model 170 has its own unique amount of downscaling or coarseness as specified by which grid square size 160 is used to generate a the geometric model 170.

Grid square size 160 specifies the density of a geometric model 170. Grid square size 160 defines the Cartesian grid into which raw data set 130 is rasterized. A small grid square size 160 defines a fine Cartesian grid. A large grid square size 160 defines a coarse Cartesian grid. The amount of downscaling and lossy compression imposed during generation of a geometric model 170 is proportional to the grid square size 160 used during generation. If grid square size 160 has a value of 1, then the least visual information is lost when generating a geometric model 170. The visualization expert chooses what is a maximum grid square size 160 well before geometric models 170 are generated.

Image sharpness and smoothness suffer when downscaling is not optimized for a combination of a particularly sized region of raw data set 130 with a particular display resolution. Another problem with downscaling is its heavy computational load, which is unsuited for interactive use, even though most visual applications are interactive. The computational intensity of rasterization and downscaling may exceed the capacity of a personal computer, even though most visualization occurs at a personal computer.

2.2 Eager Generation of Geometric Models

Computer 100 avoids these problems by decoupling rasterization and downscaling from display image generation. This decoupling enables computer 100 to perform rasterization and downscaling to geometric models 170 and then defer display image generation for a later time or delegate display image generation to another computer such as a display terminal, which may be a personal computer. For example, computer 100 may have data storage and processing capacity much greater than that of the personal computer that eventually generates, or at least displays, corresponding display images.

Decoupling of rasterization and downscaling from image generation by computer 100 is temporal as well as architectural. Computer 100 eagerly generates geometric models 170 in advance and well before display image generation or presentation occurs. This enables a personal computer to show, almost instantaneously, display images that may have taken computer 100 several minutes or hours to generate, including generating geometric models 170 as an intermediate format. However, eager generation of geometric models 170 introduces additional problems, such as uncertainty as to which display monitor resolution will later be available and which zoom level will be desired.

2.3 Size Parameters

To overcome the problems introduced by eager generation of geometric models 170, including downscaling of raw data set 130, computer 100 utilizes abstraction function 120, quality interval 140, size pairs 150, and grid square sizes 160, as parameters that guide rasterization and downscaling during generation of geometric models 170. As such, computer 100 potentially uses all of the information within generation parameters 110 to generate geometric models 170.

A visualization may be shown on any of various display monitors having different screen resolutions. Eagerly generating geometric models 170 for all possible combinations of display resolution and zoom level is combinatorially intractable. A small subset of combinations, intelligently selected for high utility, is needed to guide computer 100 in the generation of geometric models 170.

Computer 100 uses size pairs 150 as that high utility subset of display combinations. According to an embodiment, these combinations may be chosen by a person with expertise in evaluating image quality and visualization. After the visualization expert defines size pairs 150, these pairs may be reused for many raw data sets 130. Each size pair 150 includes portion size 154.

Portion size 154 defines a rectangular extent within raw data set 130, but is not dedicated to any particular region of raw data set 130. For example, raw data set 130 may represent microelectronic circuitry details for a VLSI having sub-wavelength lithographic features including a billion transistors. As such, the natural resolution of raw data set 130 might be as coarse as 200 microns×200 microns per data point or possibly as fine as 10 nanometers×10 nanometers per data point.

Portion size 154 may be a rectangle sized to some multiple of the data point size to encompass some percentage of raw data set 130. Portion size 154 effectively defines an initial zoom level. The smaller is portion size 154, then the more initial magnification or zooming in is achieved, and the less raw data will be included in geometric models 170 generated with portion size 154. However, portion sizes 154 are merely proposals that guide computer 100 during selection of a particular grid square size 160 to use when generating a geometric model 170. Although each portion size 154 specifies a portion, all geometric models 170 cover the entire geometric extent of raw data set 130.

Each size pair 150 also includes view size 152. View size 152 defines a rectangular extent within a display monitor, but is not dedicated to any particular region of raw data set 130. For example, a common modern display monitor size is 1,366 pixels×768 pixels. If intended for that common monitor size, view size 152 may specify any rectangle that does not exceed the monitor size. For example, if an expert decides that a user will often seek a visualization that fills only half of the display monitor, then view size 152 may be correspondingly smaller than the monitor size. The expert may choose a variety of display viewport sizes that are various fractions of a given display monitor size. Likewise, the expert may identify a variety of display monitor sizes based on market preferences that are current or recent.

As such, the expert may identify a dozen or so view sizes 152. Likewise, the expert may define tens or more portion sizes 154. These view sizes 152 may be exhaustively paired with these portion sizes 154 to achieve hundreds of pairings. However, the visualization expert then identifies a subset of these pairings that are expected to be needed most often and visually appear best. This expertly chosen subset of pairings is the extent of size pairs 150.

2.4 Image Quality Interval

Although FIG. 1 shows a line that represents an association between grid square sizes 160 and size pairs 150, this association may be initially absent in generation parameters 110. Computer 100 may need to determine this association, which is many-to-many. Computer 100 may associate a given size pair 150 with more than one grid square size 160. Likewise, computer 100 may associate a given grid square size 160 with more than one size pair 150. Determination of this association is arithmetic and based on numeric attributes of grid square size 160, size pair 150, and quality interval 140.

Quality interval 140 is a range of positive real numbers having a lower bound and an upper bound. Image quality measures how many display monitor pixels are needed to draw one grid square of a geometric model 170. A small image quality value indicates high fidelity of geometric model 170 to raw data set 130. A large image quality value indicates high compression within geometric model 170. Quality interval 140 is chosen well before generation of geometric models 170 by the visualization expert. Experimentation revealed that an inclusive range of 1.5 to 4 is optimal for quality interval 140 during visualization based on modern VLSI design rules for feature sizes and popular modern display terminal sizes.

Computer 100 uses quality interval 140 to determine which size pairs 150 to associate with which grid square sizes 160. Computer 100 makes this determination by calculating the image quality of a possible association between a given size pair 150 and a given grid square size 160. Computer 100 performs this calculation according to a mathematical formula that multiplies the grid square size 160 times the ratio of view size 152 to portion size 154. If and only if the formula result falls within quality interval 140, then computer 100 makes an association between a given size pair 150 and a given grid square size 160.

2.5 Selecting Geometric Models

Each of geometric models 170 represents the same area of a plane of a fixed natural size, such as 1,000×1,000 square microns. Each grid square size 160 has a value that is the length of a side of a unit square in a Cartesian grid and measured in units natural to raw data set 130, such as microns. Each geometric model 170 is generated using a unique grid square size 160. As such, multiple geometric models 170 do not share a grid square size 160. Likewise, there are not more geometric models 170 than grid square sizes 160. However there may be more grid square sizes 160 than geometric models 170, in which case some grid square sizes 160 are not used to generate any geometric model 170.

Not all grid square sizes 160 need be associated with size pairs 150. Unassociated grid square sizes 160 are not used to generate a geometric model 170. Furthermore, computer 100 detects a base square size that is which grid square size 160 is associated with the most size pairs 150. According to criteria explained later herein, grid square sizes 160 that are smaller than the base square size are unlikely to be used to generate geometric model 170. Only grid square sizes 160 that are multiples of the base square size are likely to be used to generate a geometric model 170. However many grid square sizes 160 are used to generate a geometric model 170 determines how many geometric models 170 that computer 100 generates, since each grid square size 160 is used to generate at most one geometric model 170.

2.6 Populating Geometric Models With Data

After identifying which geometric models 170 to generate, computer 100 fills them with data. Computer 100 first generates a finest geometric model 170 by using the base square size. Computer 100 populates the finest geometric model 170 by iteratively applying abstraction function 120 to the details of raw data set 130. The finest geometric model 170 has a Cartesian grid with a unit square that matches the base square size. Each invocation of abstraction function 120 calculates a value for one unit square within the finest geometric model 170. Once populated, the finest geometric model 170 can be used as a data source for downscaling to various degrees to populate the remaining geometric models 170.

Computer 100 only uses grid square sizes 160 that are multiples of the base square size to generate the remaining geometric models 170. This regularity of involved grid square sizes 160 simplifies the downscaling needed to populate the remaining geometric models 170. Population of the finest geometric model 170 is the only one that involves rasterization from raw data set 130. Population of the remaining geometric models 170 is based on the data in the finest geometric model 170.

2.7 Cost Power Law Prunes Np-Hard Combinatorics

Figure 2:
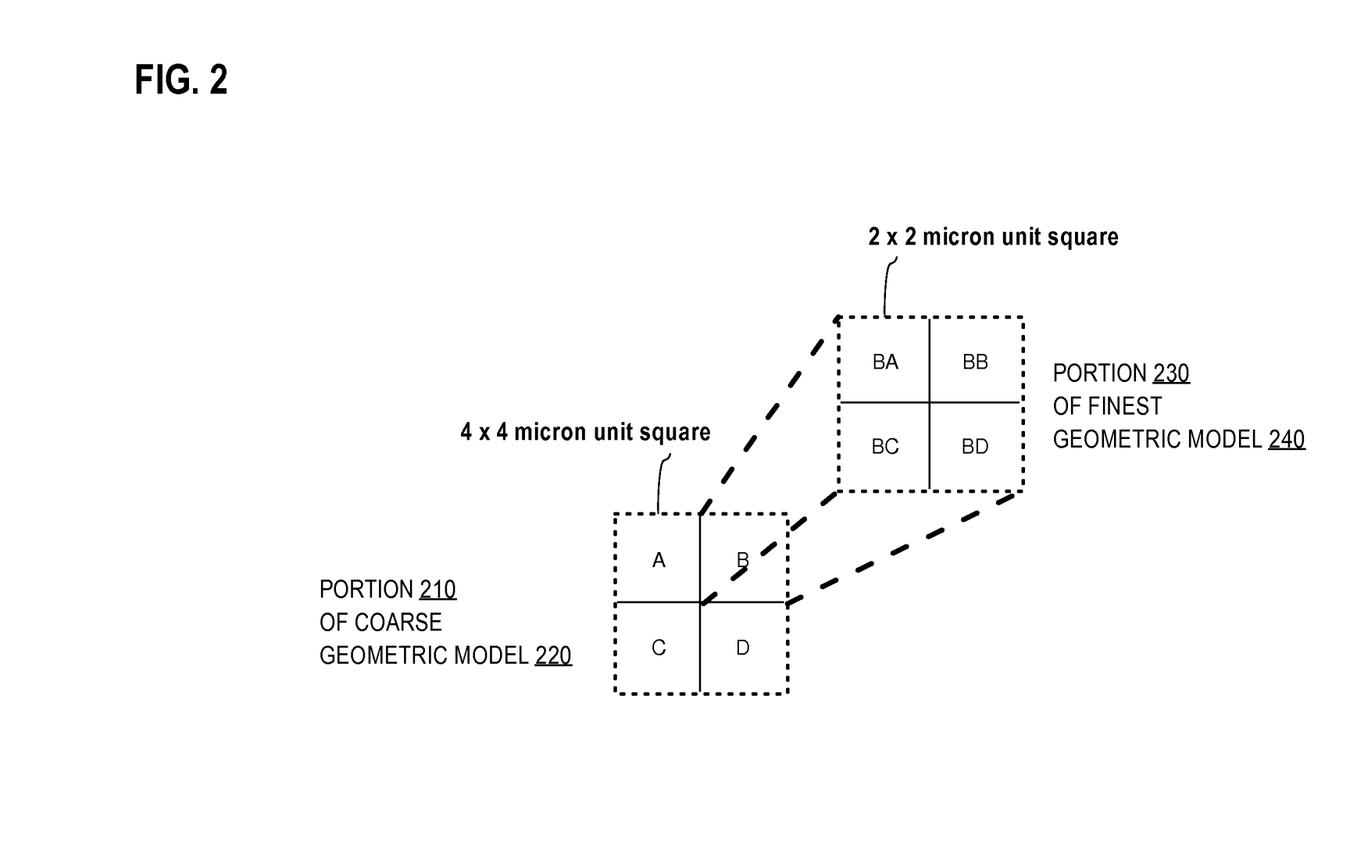
FIG. 2 is a sketch illustrating portions of example geometric models in which certain techniques described herein may be implemented, according to various embodiments.

For example, FIG. 2 depicts portion 230 of finest geometric model 240 and portion 210 of another geometric model 220. Four base squares (BA, BB, BC, and BD) of finest geometric model 240 fit into a unit square, such as unit square B, of geometric model 220. Because of this neat fitting, a computer need not apply an abstraction function to a raw data set to populate geometric model 220 with values. The computer may instead minimize computation by applying the abstraction function to the data of portion 230 to determine a value for unit square B. As such, the computer may derive the remaining geometric models by downscaling finest geometric model 240.

Geometric Model Computation is modeled as a class of problems called 'set covering problems' in combinatorial optimization, specifically a binary integer programming problem. Such problems are typically NP-hard unless some problem-specific constraint or property can be used to eliminate combinations in bulk. Such a property is exploited to reduce computation while intelligently selecting which geometric models to generate. The cost of choices follows a predictable power law, because a grid square size compresses space by the square of its value. Hence, cost changes predictably.

3.0 Geometric Model Generation Process

Figure 3:
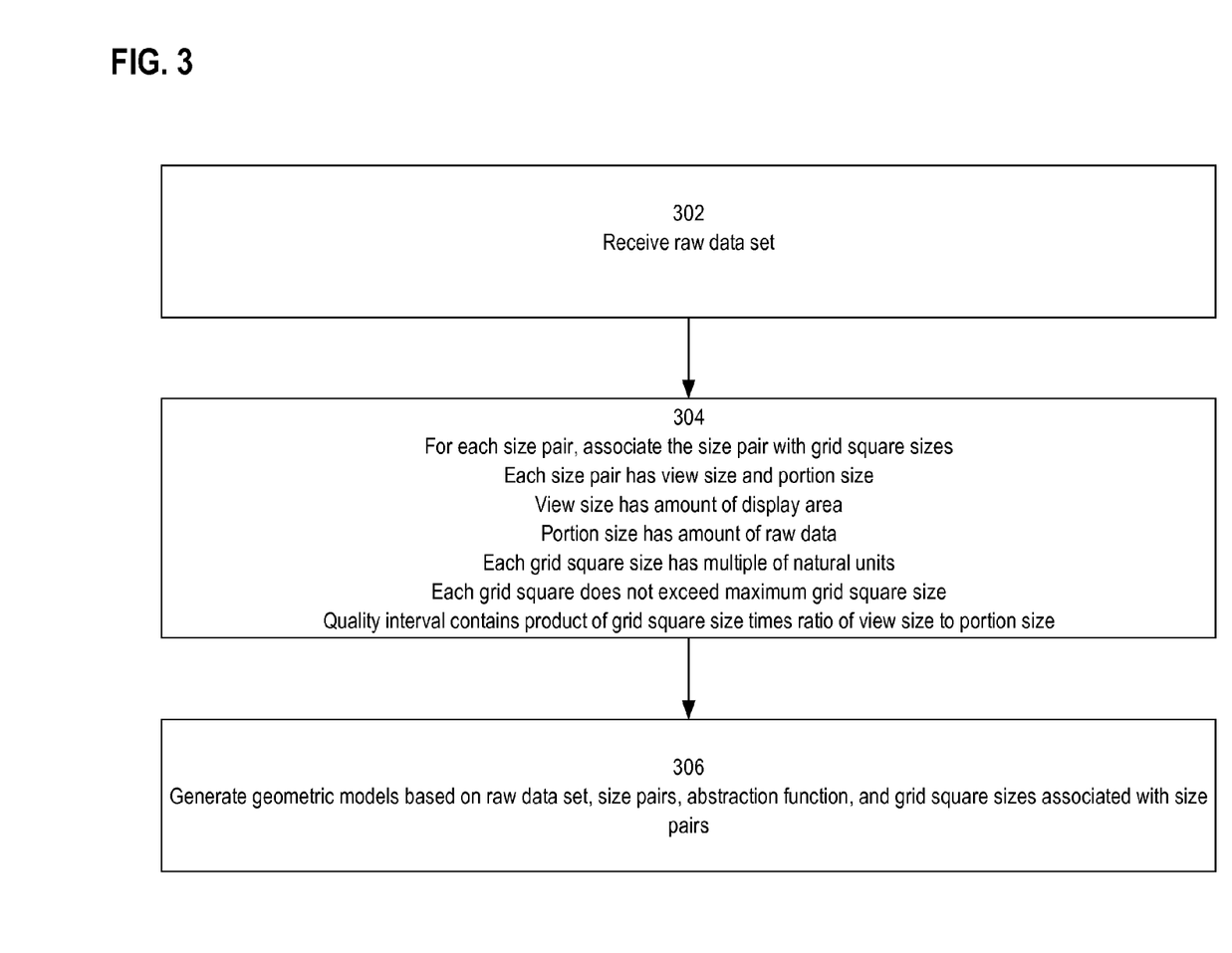
FIG. 3 illustrates an example process for generating geometric models according to an embodiment.

FIG. 3 depicts a flow diagram of an example process for generating geometric models. For illustrative purposes, FIG. 3 is discussed in relation to FIG. 1.

Step 302 is preparatory and not computational. In step 302, a computer receives raw data set 130 from which geometric models 170 may be derived. Spatial dimensions associated with raw data set 130 may be expressed in natural units, such as microns.

Step 302 is preparatory and not computational. In step 302, a computer receives metadata and raw data needed to determine a variety of complementary and sufficient geometric models. Computer 100 also receives raw data set 130.

In step 304, the computer analyzes metadata to determine a variety of complementary and sufficient geometric models. For example, computer 100 has metadata that includes abstraction function 120, quality interval 140, size pairs 150, and grid square sizes 160. Computer 100 associates grid square sizes 160 to size pairs 150 to decide how many geometric models 170 to generate and what size are their unit squares.

Computer 100 uses quality interval 140 to determine which size pairs 150 to associate with which grid square sizes 160. Computer 100 makes this determination by calculating the image quality of a possible association between a given size pair 150 and a given grid square size 160. Computer 100 performs this calculation according to a mathematical formula that multiplies the grid square size 160 times the ratio of view size 152 to portion size 154. If and only if the formula result falls within quality interval 140, then computer 100 makes an association between a given size pair 150 and a given grid square size 160. Step 304 may involve heuristics and structures, such as an incident matrix and cost metrics, that are described later herein.

In step 306, the computer generates the geometric models. During this step, computer 100 has already decided which geometric models 170 to generate. Computer 100 applies abstraction function 120 to raw data set 130 to populate a finest geometric model 170. Computer 100 may then downscale the finest geometric model 170 using a variety of grid square sizes 160 to generate the remaining geometric models 170. Computer 100 may save geometric models 170 to files in durable storage for later use during visual image generation.

3.1 Selection of Base Square Size

Figure 4:
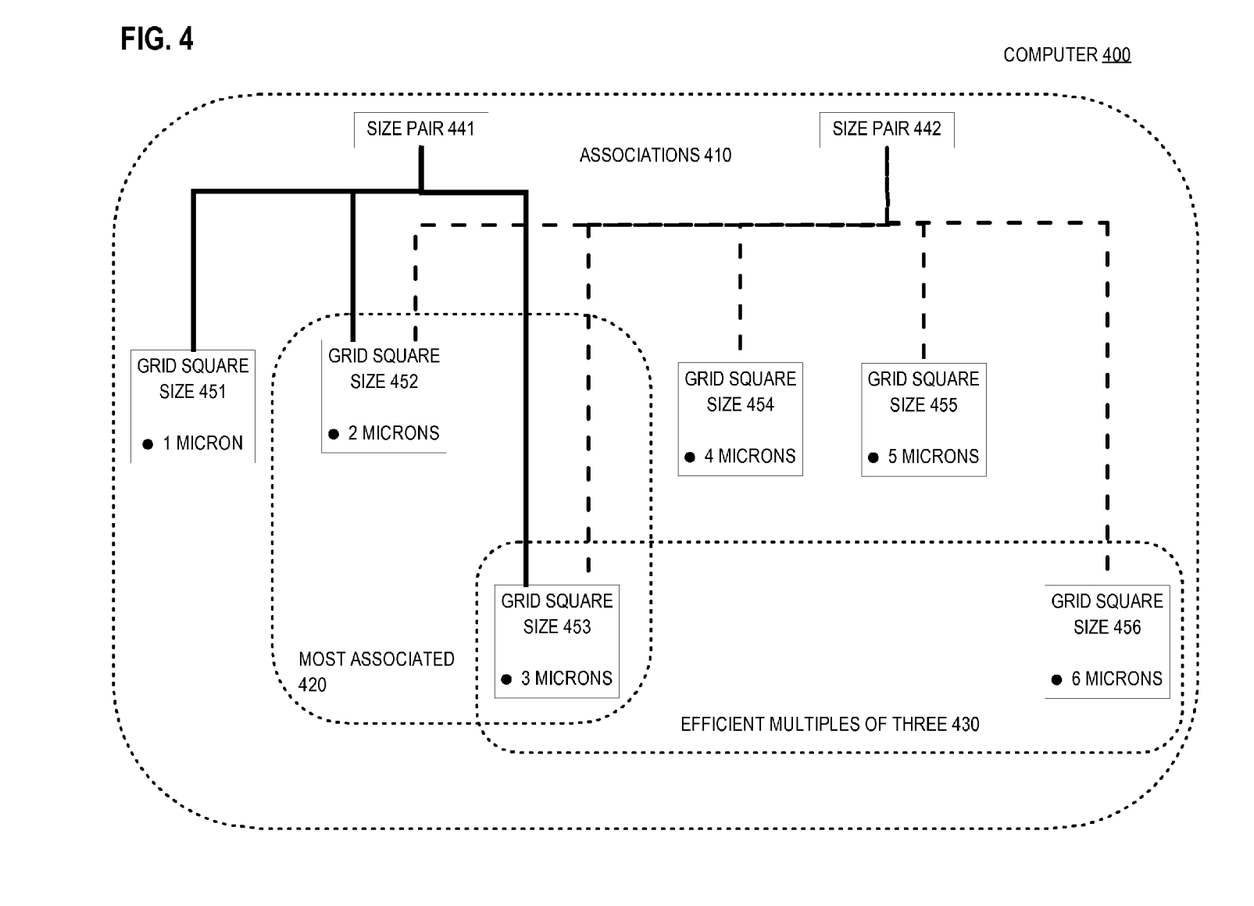
FIG. 4 is a logical block diagram illustrating an example computer in which certain techniques described herein may be implemented, according to various embodiments.

FIG. 4 illustrates a block diagram of example computer 400 that heuristically generates geometric models of various resolutions from raw data based on quality criteria, in which techniques described herein may be practiced. Computer 400 may be an implementation of computer 100. Computer 400 has data structures that include size pairs 441-442 and grid square sizes 451-456.

Computer 400 begins geometric model determination by first selecting a base square size from the available grid square sizes. As explained before, computer 400 uses a quality interval to determine which size pairs 441-442 to associate with which grid square sizes 451-456. Computer 400 makes this determination by calculating the image quality of a possible association between a given size pair and a given grid square size. If and only if the calculated image quality falls within the quality interval, then computer 400 makes an association between a given size pair and a given grid square size. The result of such association determinations is shown in FIG. 4. Associated with size pair 441 are grid square sizes 451-453, respectively sized at 1-3 microns. Associated with size pair 442 are grid square sizes 452-456, respectively sized at 2-6 microns.

The union of all associations is shown as associations 410, which includes grid square sizes 451-456 because those grid square sizes are associated with size pairs. Of the grid square sizes in associations 410, grid square sizes 452-453 are each associated with two size pairs, which are the most associations of all the grid square sizes in associations 410. As such, most associated 420 includes only grid square sizes 452-453. Most associated 420 is relevant to computer 400 because it contains the grid square sizes that are the initial candidates for being the base square size, which is crucial for determining geometric models.

As a heuristic, computer 400 begins by selecting the biggest grid square size of most associated 420 for consideration as the base square size. As such, computer 400 selects grid square size 453 to evaluate as a possible base square size.

As already explained, computer 400 only generates geometric models whose grid square size are multiples of the base square size. Because in this example the base square size is 3 microns wide, the only other grid square size that has a multiple of 3 is grid square size 456, which is 6 microns wide. As such, computer 400 considers generating only two geometric models that respectively have unit square sizes of 3 microns and 6 microns. This is shown as efficient multiples of three 430 that contains only grid square sizes 453 and 456. However many grid square sizes are in efficient multiples of three 430 is how many geometric models that computer 400 will generate.

3.2 Selecting a Geometric Model for Display Image Generation

Later, after geometric model generation and during interactive display, a presentation device may try to show a portion of a geometric model at some zoom level and inside a cropped screen real estate. The presentation device may perform complex steps such as selecting a geometric model, fetching it from storage, and generating a display image for painting the cropped screen real estate. For various reasons, the presentation device may logically decompose a display image into rectangular tiles, such as to generate or cache some image portions.

The presentation device may be a sophisticated workstation computer rendering to a video wall. Alternatively, the presentation device may be minimal and barely more than a digital picture frame. If unequipped to perform a step while generating a display image from a geometric model, the presentation device may delegate almost any operation to a more capable computer, such as computer 400. For example, a digital picture frame is likely incapable of directly utilizing a geometric model in any way. The digital picture frame may instead retrieve, zoom, and crop a display image stored on a data storage grid. Another computer would be responsible for generating display images from geometric models and then storing the display images on the data storage grid. In other words, the presentation device may be a federation of devices of various purposes.

The presentation device must decide which geometric model to use to generate a display image. A naïve implementation may generate the display image from a randomly selected geometric model, so long as the geometric model involves the desired raw data set. However, a random selection likely results in a display image that appears poorly focused and damaged by too lossy compression. Instead of random selection, embodiments may select according to criteria that give more detailed images and minimize blur.

For example, an embodiment may process rendering parameters, such as cropping bounds or acceptable latency to select a geometric model. For example, if latency is a priority, a geometric model with a bigger unit square size might load faster. If quality is a priority, then a smaller unit square size might be better.

An embodiment of the presentation device might have access to size pairs 441-442, and if so might also be configured to compare rendering parameters to size pairs 441-442 to select a geometric model. Although not shown, size pairs 441-442 each have a view size of screen real estate and a portion size of a geometric model, as shown in FIG. 1. As such, the client device attempts to crop and zoom according to actual parameters that are more similar to one of size pairs 441-442 than the other one.

If the crop and zoom parameters are more similar to size pair 441, then a display image may be generated from the geometric model that has grid square size 453. This is because grid square size 453 is the only grid square size within efficient multiples of three 430 that is associated with size pair 441. On the other hand, size pair 442 is associated with both grid square sizes within efficient multiples of three 430. Therefore, if the crop and zoom parameters are more similar to size pair 442, then a display image may be generated from either the geometric model that has grid square size 453 or the geometric model that has grid square size 456.

3.3 Maximizing Coverage Of Size Pairs During Geometric Model Generation

Figure 5:
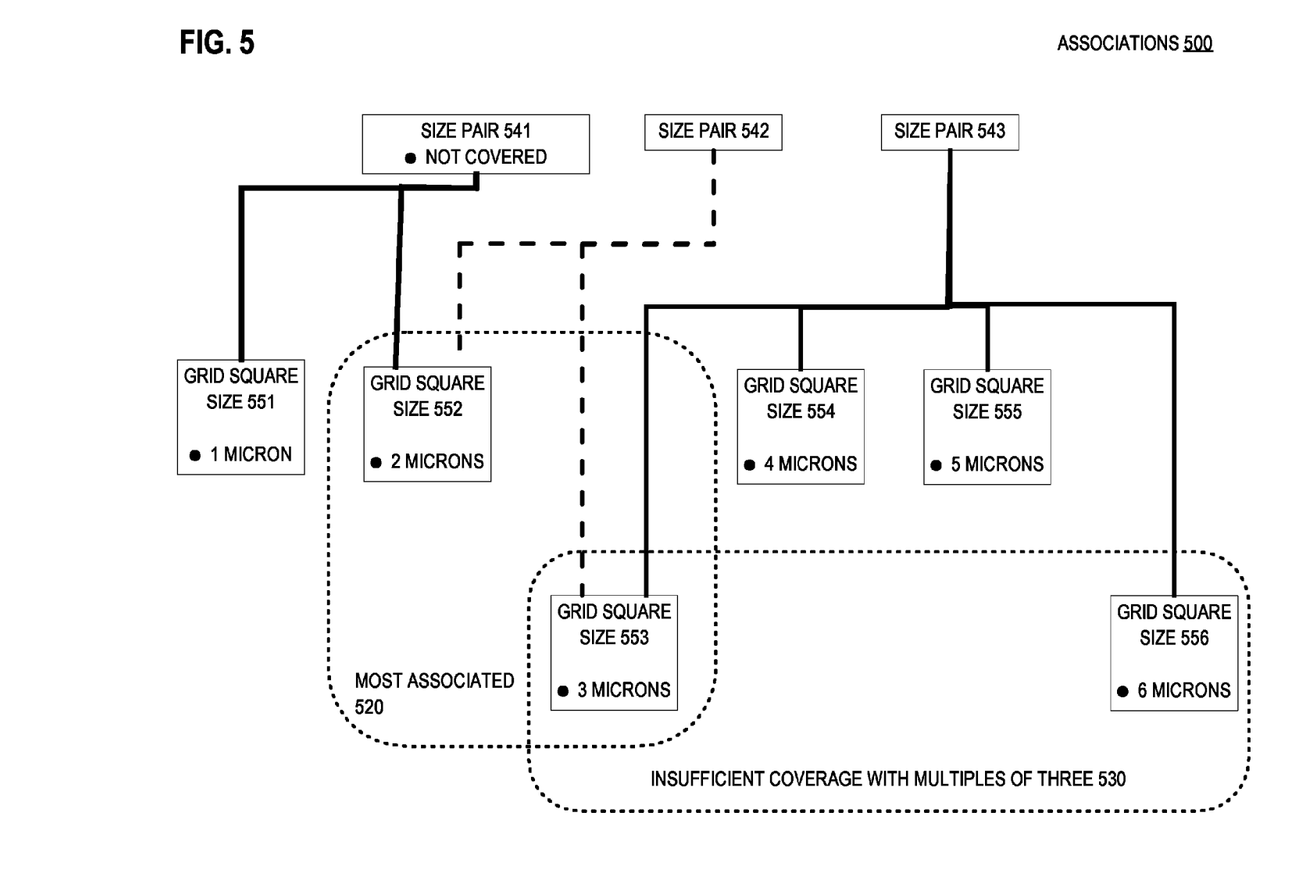
FIG. 5 is a logical block diagram illustrating example associations in which certain techniques described herein may be implemented, according to various embodiments.

FIG. 5 illustrates a block diagram of example computer 500 that evaluates a base square size and conditionally replaces it, in which techniques described herein may be practiced. Computer 500 may be an implementation of computer 100. Computer 500 has data structures that include size pairs 541-543, which are associated with grid square sizes 551-556.

Using heuristics similar to those used in FIG. 4, most associated 520 contains only grid square sizes 552-553, each of which is associated with two size pairs. However, although grid square size 553 is shown as the base square size within multiples of three 530, this is an inferior choice of base square size. The problem is that size pair 541 is not associated with any grid square size within multiples of three 530. Size pair 541 might correspond to especially common rendering parameters.

The harm of skipping an important size pair can be assessed by measuring a coverage ratio of size pairs associated with multiples of three 530 to size pairs associated with any grid square size. With grid square size 553 as the base square size as shown, the coverage ratio is only 2 out of 3 size pairs or 67%, which might be unacceptable. For example, a coverage ratio should be at least 90% in practice.

Inadequate coverage may be cured by switching the base square size to a slightly smaller grid square size within most associated 520. In this example, grid square size 552 is the only other one within most associated 520. Although not shown, with grid square size 552 as the base square size, multiples 530 would instead contain only grid square sizes that are multiples of 2 instead of 3. As such, multiples 530 would contain only grid square sizes 552, 554, and 556 because their widths respectively are 2, 4, and 6 microns, which are multiples of 2. That gives 100% coverage.

3.4 Populating an Incidence Matrix and Calculating Unit Costs

Figure 6:
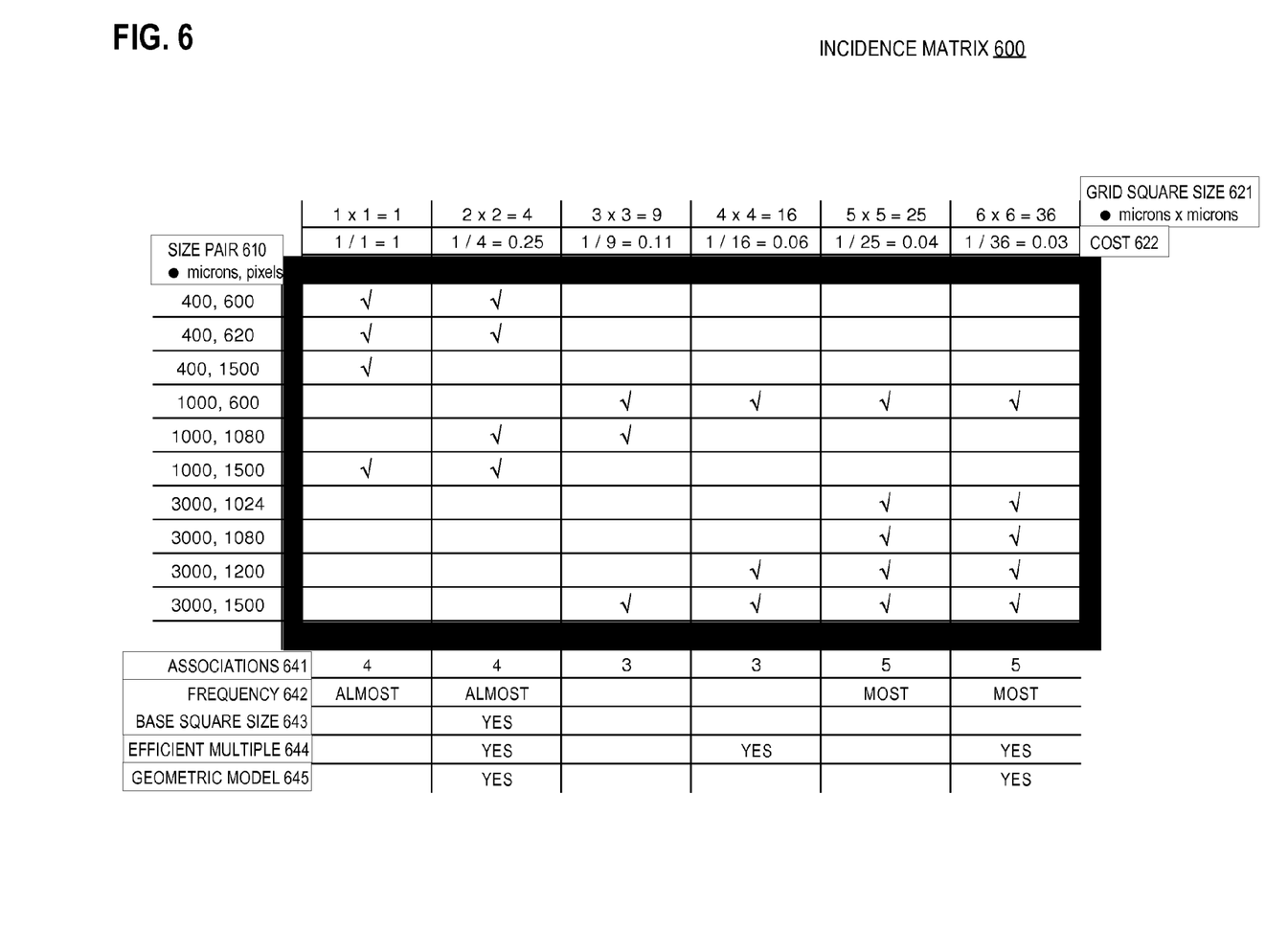
FIG. 6 is a logical block diagram illustrating an example incidence matrix in which certain techniques described herein may be implemented, according to various embodiments.

FIG. 6 illustrates example incidence matrix 600 that may be used when selecting a base square size, in which techniques described herein may be practiced. Incidence matrix 600 has size pair 610 and table rows 621-622 and 641-645. Size pair 610 is a header column that lists pairs of numbers. The first number of each pair is the width, in natural units such as microns, of a square portion of the geometric models. The second number of each pair is the pixel width of a display image.

Grid square size 621 is a header row that lists grid square sizes in natural units such as microns. Cost 622 is a header row that lists a cost for each grid square size. Cost accounts for concerns such as compute, transport, and storage of a geometric model. Cost is defined as the inverse of the area of a Cartesian unit square of a geometric model.

Each square listed in grid square size 621 corresponds to a geometric model. The finest geometric model has a 1×1 grid square size and a cost of 1. The next finest geometric model has a 2×2 grid square size and a cost of 0.25. As the grid square size increases, the corresponding geometric model gets coarser, and the cost decreases. Indeed, a coarse geometric model costs less than a fine geometric model. The coarse geometric model needs less space and processing. This is especially true during geometric model generation, where geometric models are generated by downscaling a finest geometric model, the one with the base square size as its grid square size.

Cost is important for efficiency. A naïve embodiment may ignore cost and generate a geometric model for every desired grid square size. An optimized embodiment avoids generating a geometric model for some grid square sizes, such as those that increase cost without increasing coverage.

In FIG. 6, a thick black box is drawn around the binary cells of incidence matrix 600. These binary cells have actual data, shown as blanks and checkmarks, which are not headers. This core of incidence matrix 600 is also known as a logical matrix, a binary matrix, a relation matrix, or a Boolean matrix. A checkmark indicates an association between a size pair and a grid square size.

As explained for FIG. 1, a quality interval determines which size pairs to associate with which grid square sizes. The determination is made by calculating the image quality of a possible association between a given size pair and a given grid square size. This calculation uses a mathematical formula that multiplies the grid square size times the ratio of display view size to portion size. If and only if the formula result falls within quality interval, then an association is made between a given size pair and a given grid square size.

For example, one row of incidence matrix 600 has a size pair of 1,000×1,500. The ratio of display view size to portion size is 1,500/1,000=1.5. To calculate image quality, this ratio is multiplied by whichever grid square size is contemplated. For example, a 2×2 grid square has a width of 2, which gives an image quality of 2×1.5=3, which is within a quality interval having a range of 1.5 to 4. As such, the 2×2 grid square size should be associated with the 1,000×1,500 size pair. Hence, a checkmark is shown in the cell at the intersection of the 2×2 column and the 1,000×1,500 row of incidence matrix 600.

However, if image quality is recalculated with the 3×3 grid square size, then image quality is 3×1.5=4.5, which is not within the quality interval having a range of 1.5 to 4. As such, the 3×3 grid square size should not be associated with the 1,000×1,500 size pair. Hence, there is no checkmark in the cell at the intersection of the 3×3 column and the 1,000×1,500 row of incidence matrix 600.

3.5 Using the Incidence Matrix to Select Base Square Size

Rows 641-645 of incidence matrix 600 can be automatically derived from the binary matrix within incidence matrix 600. Associations 641 is a row of incidence matrix 600 that counts how many checkmarks each column of the binary matrix has. Each checkmark denotes an association.

Frequency 642 is a row of incidence matrix 600 that ranks how many checkmarks each column of the binary matrix has, relative to the other columns. Base square size 643 is a row of incidence matrix 600 that designates which column has the grid square size of the finest geometric model to be generated. Grid square sizes may be prioritized for evaluation as candidates for base square size. The priority may be according to frequency 642, with ties going to the bigger grid square size.

According to frequency 642, grid square sizes 5×5 and 6×6 are most frequently associated with size pairs. However, a base square size of 5×5 or 6×6 lacks coverage. Only half of the rows have checkmarks in either the 5×5 or 6×6 column, which is only 50% coverage. And, there are no efficient multiples of 5 or 6 to increase the coverage by contributing additional columns.

Because 5×5 and 6×6 are too big to be the base square size, the grid square sizes that are the next most frequently associated with size pairs are evaluated as candidates for base square size. Frequency 642 shows ALMOST in the 1×1 and 2×2 columns, so these columns are the next candidates. Grid square size 2×2 is bigger than grid square size 1×1, so grid square size 2×2 is evaluate first as a candidates to be the base square size. Base square size 643 shows that grid square size 2×2 is the base square size.

Efficient multiple 644 is a row of incidence matrix 600 that shows that 2, 4, and 6 are efficient multiples of 2, the base square width. Generating three geometric models with 2×2, 4×4, and 6×6 grid square sizes provides an adequate 90% coverage, because only the 400×1500 row of the binary matrix lacks a checkmark for those grid square sizes. However, this is not the cheapest set of geometric models that achieves 90% coverage.

For example, according to the binary matrix, all of the rows covered with checkmarks in the 4×4 column also have checkmarks in the 6×6 column. That means that the 4×4 column provides no coverage beyond what the 6×6 column provides. As such, the 4×4 grid square size is redundant since it does not increase coverage. Geometric model 645 is a row of incidence matrix 600 that designates which geometric models will be generated. Even though the 4×4 grid square size is an efficient multiple of the base square size, the 4×4 grid is not designated for generation because it is redundant.

Even though not all of the efficient multiples are used in this example, using efficient multiples helps quickly select a feasible set of geometric models. That is, efficient multiples accomplishes pruning of the solution space. When there are contiguous checkmarks on a row for a given size pair, then any grid square size within the contiguous range has similar coverage and so is likely to be redundant. There is not much value in simultaneously searching solution branches of contiguous columns. Efficient multiples cause searches to have some separation within the solution space, which is a more efficient way of searching for an optimum.

4.0 Unit Cost of Generating a Given Geometric Model

In FIG. 6, the example solution has two geometric models, which are 2×2 and 6×6, that achieve 90% coverage. However, another solution with two geometric models, which are 1×1 and 6×6, also achieves 90% coverage. Cost determines which solution should be generated. The cost 622 row of incidence matrix 600 shows the cost of each geometric model. The cost of a solution is the sum of costs of geometric models in the solution. The 1×1 costs 1, and the 6×6 costs 0.03, for a total solution cost of 1+0.03=1.03. The 2×2 costs 0.25, and the 6×6 costs 0.03, for a total solution cost of 0.25+0.03=0.28, which is cheaper than 1.03. Therefore the solution with 2×2 and 6×6 should be generated, and not the solution with 1×1 and 6×6. So long as a coverage percentage exceeds a threshold, such as 90% or 95%, a cheaper solution is preferable over a higher cost solution with higher coverage, such as 100%.

Cost is predictable. The marginal cost of adding higher multiples is very small. Once a geometric model is made at base square size, computing other geometric models is trivial. There is no need to iterate through the raw data set for each additional geometric model that is generated.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
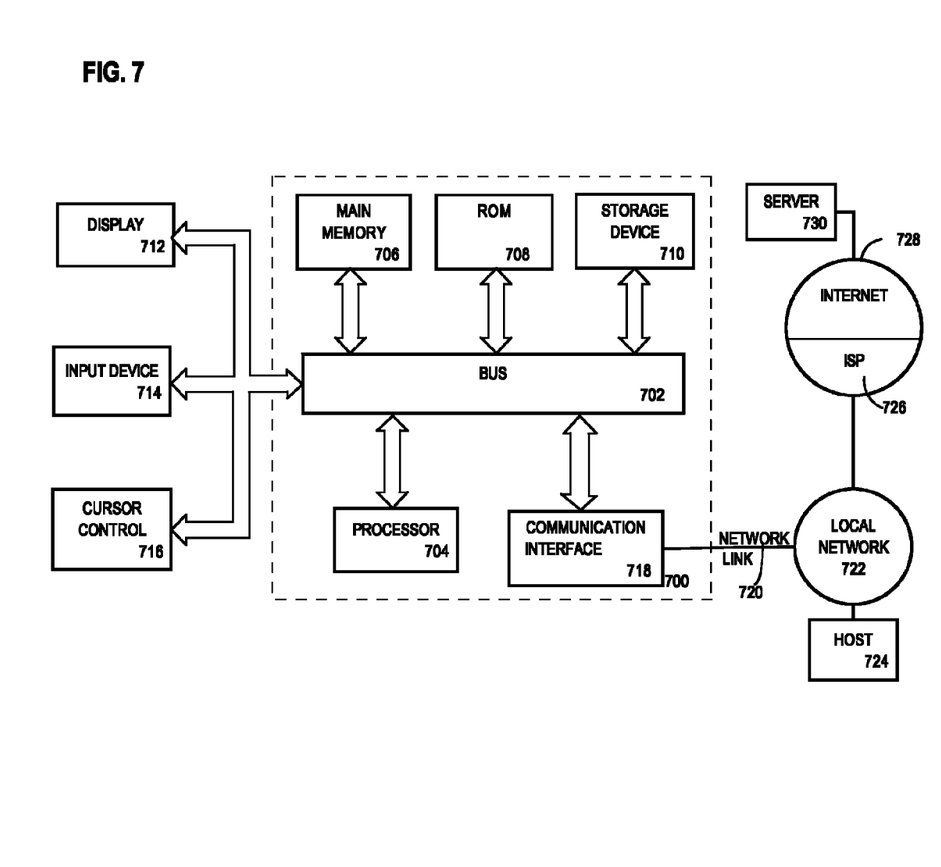
FIG. 7 is a block diagram illustrating one embodiment of a computer system suitable for implementing methods and features described herein.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a light emitting diode (LED) display, for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a raw data set;
   for each size pair of a plurality of size pairs, associating with the each size pair a set of grid square sizes, wherein each grid square size comprises a multiple of natural units, wherein each size pair comprises a view size and a portion size, wherein the view size comprises an amount of display area, wherein the portion size comprises an amount of raw data, wherein a quality interval contains a multiplicative product of the grid square size times a ratio of the view size to the portion size;
   identifying a base grid square size occurring most frequently in the sets of grid square sizes associated with the size pairs of the plurality of size pairs;
   determining a coverage ratio of a count of size pairs of the plurality of size pairs having a non-empty set of grid square sizes to a total count of size pairs;
   decreasing the base grid square size if the coverage ratio is below a threshold;
   generating a set of geometric models based on the raw data set, the plurality of size pairs, an abstraction function, and a subset of the set of grid square sizes associated with the plurality of size pairs;
   selecting a geometric model based on an amount of display area and a magnification factor;
   generating a display image based on the geometric model;
   wherein the method is performed by one or more computers.

2. The method of claim 1 wherein identifying a base grid square size comprises selecting as the base grid square size a largest grid square size occurring most frequently in the sets of grid square sizes if multiple grid square sizes occur most frequently.

3. The method of claim 1 further comprising:
   determining a union of sets of grid square sizes associated with the size pairs of the plurality of size pairs;
   determining a feasible subset of the union of sets of grid square sizes, wherein each grid square size of the feasible subset is a multiple of the base grid square size;
   wherein generating a set of geometric models for each pair size is further based on an intersection of the feasible subset with the set of grid square sizes associated with the each size pair.

4. The method of claim 3 wherein determining the feasible subset comprises removing an extraneous grid square size from the feasible subset if the removal does not cause the coverage ratio to fall below the threshold.

5. The method of claim 4 wherein extraneous grid square size is a largest grid square size in the feasible subset.

6. The method of claim 1 wherein:
   each grid square size does not exceed a maximum grid square size;
   the method further comprises increasing the maximum grid square size if the base grid square size is 1 and the coverage ratio is below the threshold.

7. The method of claim 1 further comprising increasing the base grid square size if the coverage ratio exceeds the threshold.

8. The method of claim 1 wherein an inclusive range from 90% to 95% comprises the threshold.

9. The method of claim 1 wherein the abstraction function comprises a function that performs geometric or mathematical aggregation.

10. The method of claim 9 wherein the abstraction function comprises a function that computes one oft a maximum, a minimum, a mean, a variance, a median, or a mode.

11. The method of claim 1 wherein the raw data set consists essentially of polygons.

12. The method of claim 11 wherein generating the set of geometric models is based on a subset of the raw data set having a same type of polygon.

13. The method of claim 1 wherein the quality interval comprises an inclusive range from 1.5 to 4.

14. One or more non-transient computer readable media comprising instructions that when executed by one or more processors cause:
   receiving a raw data set;
   for each size pair of a plurality of size pairs, associating with the each size pair a set of grid square sizes, wherein each grid square size comprises a multiple of natural units, wherein each size pair comprises a view size and a portion size, wherein the view size comprises an amount of display area, wherein the portion size comprises an amount of raw data, wherein a quality interval contains a multiplicative product of the grid square size times a ratio of the view size to the portion size;
   identifying a base grid square size occurring most frequently in the sets of grid square sizes associated with the size pairs of the plurality of size pairs;
   determining a coverage ratio of a count of size pairs of the plurality of size pairs having a non-empty set of grid square sizes to a total count of size pairs;
   decreasing the base grid square size if the coverage ratio is below a threshold;
   generating a set of geometric models based on the raw data set, the plurality of size pairs, an abstraction function, and a subset of the set of grid square sizes associated with the plurality of size pairs;
   selecting a geometric model based on an amount of display area and a magnification factor;
   generating a display image based on the geometric model.

15. The one or more non-transient computer readable media of claim 14 wherein the instructions further cause:
   determining a union of sets of grid square sizes associated with the size pairs of the plurality of size pairs;
   determining a feasible subset of the union of sets of grid square sizes, wherein each grid square size of the feasible subset is a multiple of the base grid square size;

wherein generating a set of geometric models for each pair size is further based on an intersection of the feasible subset with the set of grid square sizes associated with the each size pair.

16. The one or more non-transient computer readable media of claim 14 wherein identifying the base grid square size comprises selecting as the base grid square size a largest grid square size occurring most frequently in the sets of grid square sizes if multiple grid square sizes occur most frequently.

17. The one or more non-transient computer readable media of claim 14 wherein the abstraction function comprises a function that performs geometric or mathematical aggregation.

18. The one or more non-transient computer readable media of claim 17 wherein the abstraction function comprises a function that computes one of: a maximum, a minimum, a mean, a variance, a median, or a mode.

* * * * *

UNITED STATES PATENT AND TRADEMARK OFFICE
CERTIFICATE OF CORRECTION

| | | |
|---|---|---|
| PATENT NO. | : 9,858,642 B2 | Page 1 of 1 |
| APPLICATION NO. | : 14/707896 | |
| DATED | : January 2, 2018 | |
| INVENTOR(S) | : Verma et al. | |

It is certified that error appears in the above-identified patent and that said Letters Patent is hereby corrected as shown below:

On the Title Page

Column 2, item (56), under Other Publications, Line 1, delete "2.5m" and insert -- 2.5µm --, therefor.

In the Specification

In Column 4, Line 19, delete "a the" and insert -- the --, therefor.

In the Claims

In Column 15, Line 60, in Claim 3, delete "with the" and insert -- with --, therefor.

In Column 16, Line 23, in Claim 10, delete "oft" and insert -- of: --, therefor.

In Column 16, Line 64, in Claim 15, delete "with the" and insert -- with --, therefor.

Signed and Sealed this
Thirty-first Day of July, 2018

Andrei Iancu
*Director of the United States Patent and Trademark Office*